Sept. 30, 1958 F. W. DE VRIJER 2,854,579

FREQUENCY-DIVISION CIRCUIT-ARRANGEMENT

Filed July 22, 1955

INVENTOR
FREDERIK WILLEM DE VRIJER

BY [signature]

AGENT 2,854,579
Patented Sept. 30, 1958

2,854,579

FREQUENCY-DIVISION CIRCUIT-ARRANGEMENT

Frederik Willem de Vrijer, Eindhoven, Netherlands, assignor, by mesne assignments, to North American Philips Company, Inc., New York, N. Y., a corporation of Delaware Application July 22, 1955, Serial No. 523,901

Claims priority, application Netherlands August 4, 1954

4 Claims. (Cl. 250—36)

This invention relates to frequency-division circuit-arrangements to which an alternating voltage from a frequency-regulated generator is supplied and whose output voltage is phase-compared with a second alternating voltage in a phase-comparison stage, a regulating voltage for controlling the frequency of the generator being taken from the output of the phase-comparison stage.

Such frequency-division circuits may be used, for example, in television transmitters for synchronizing the scanning line frequency and frame frequency with the frequency of the power line. In the case of a system having an interlaced scanning frame frequency of 25 and having 625 lines per picture, such as in the television system of C. C. I. R. standard, a generator with a frequency of 31,250 cycles is used in the television transmitter. In a frequency-division circuit, the frequency is divided by 625, thereby obtaining an alternating voltage with a frequency 50. This alternating voltage is phase-compared with the power line alternating voltage having a frequency of 50 cycles.

If the frequency of the power line voltage changes, the frequency of the generator is proportionally changed by the output voltage of the phase-comparison stage. From this generator the line frequency of 15,625 cycles is derived via another frequency-division stage which divides by a factor of 2, so that said line frequency also changes proportionally to the variations of the power line frequency.

Such a line-frequency change is often deemed objectionable and the present invention has for its object to overcome this disadvantage.

The circuit-arrangement in accordance with the invention has the feature that in the case of variation, in excess of a given value, of the frequency of the second alternating voltage, the division factor of the frequency-division circuit is altered in such manner that the generator frequency alters less than is proportional to the frequency of the second alternating voltage.

In the aforesaid television transmitter, the synchronization between the line and frame frequency and the power line frequency consequently subsists so long as the power line frequency variations are small, whereas in the case of greater variations of the power line frequency a new condition ensues in which synchronization is again present but the line freqeuncy variation is considerably smaller than in conventional circuit-arrangements on the occurrence of power line frequency variations.

The circuit-arrangement according to the invention is based on the recognition that use may, for example, be made of conventional frequency-division stages with binary division circuits with feedbacks, and when using $n$ binary division stages it is possible, by a judicious choice of the feedbacks to make all the integral division factors of from 1 to $2^n$.

Figure 1:
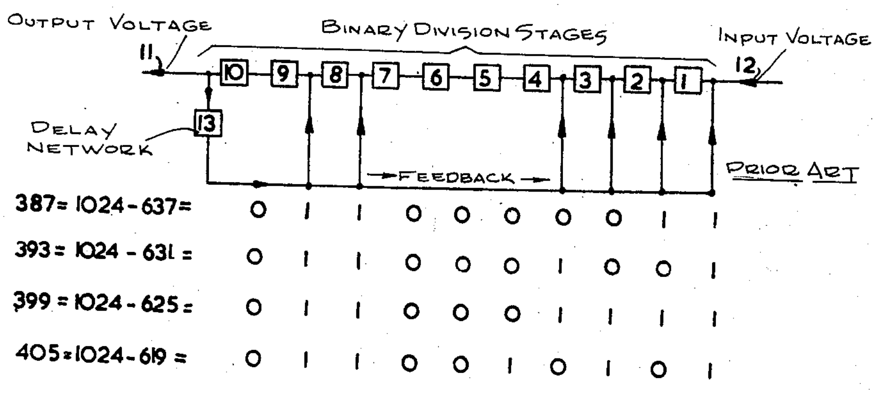
Figure 2:
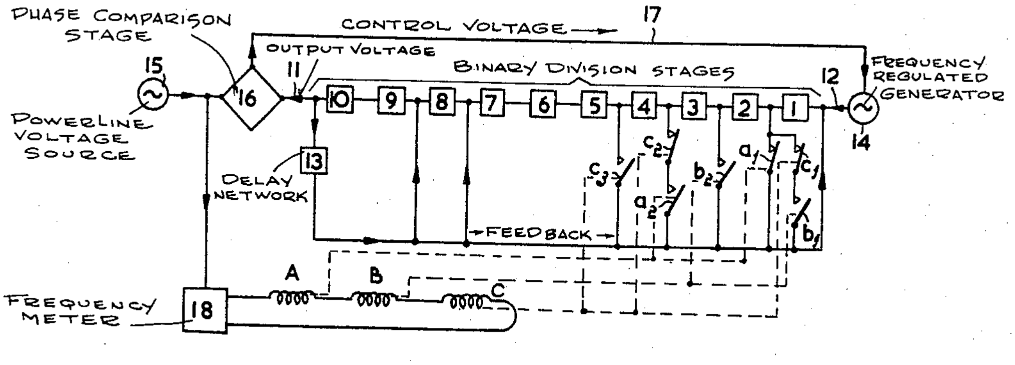

In order that the invention may be readily carried into effect, it will now be described, by way of example, with reference to the accompanying drawing, in which Fig. 1 shows such a known frequency-division stage and Fig. 2 depicts diagrammatically an example of a frequency-division circuit in accordance with the invention.

Fig. 1 shows a frequency-division stage comprising the cascade of ten binary division stages 1 to 10. In the absence of feedbacks the frequency of the alternating voltage set up at the output 11 will be a factor $2^{10}=1{,}024$ smaller than the frequency of the alternating voltage supplied to the input 12.

This figure, however, shows, a number of feedbacks from the output 11, if desired through a delay network 13, to the inputs of a number of binary division stages. In the case shown in Fig. 1 feedback occurs to the inputs of the binary division stages 1, 2, 3, 4, 8 and 9. Although the operation of this division circuit is known per se, the mechanism will be more clearly described. Each of the binary division stages may be a bi-stable multivibrator. On supplying a first impulse, the operating stage of the multivibrator flops over, a voltage variation occurring at the output being such as to not influence the next following division stage. On supplying the second pulse to the first-mentioned multivibrator, the latter resumes its earlier operating state and the resulting output voltage variation influences the operating state of the next multivibrator. In the circuit-arrangement shown in Fig. 1, an additional pulse is supplied to the stages 1, 2, 3, 4, 8 and 9 after each flyback of the last division stage 10, the operating state of said stages consequently being changed. Hence, a complete division no longer requires 1,024 pulses, but $$1{,}024-(1+2+4+8+128+265)=625$$

In Fig. 1 it is indicated in the third row, below the circuit-arrangement, that the required number of pulses should be reduced by 399 to obtain a division factor 625. The number 399 is indicated in the binary system such that, below each input of the binary divisors, the associated symbol of the number indicated in the binary system is listed. In order to obtain the division factor 625 feedback should exist where a number 1 occurs for the number 399, whereas said feedback should not exist where a 0 stands.

So long as interlaced scanning is used in television the number of lines per picture should be uneven so that only division factors such as 619, 621, 623, 625, 627 and so on can be used. For the sake of simplicity, the division factor will hereinafter be altered each time by a step 6, but it will be appreciated that, if desired, variation of the division factor may also occur in steps of two or, if the circuit-arrangement according to the invention is not intended for interlaced television systems, in steps of 1.

Fig. 1 furthermore shows the feedbacks required for obtaining the division factors 637, 631 and 619. From this figure it is found that no variations need be provided at the inputs of the division stages 1, 6, 7, 8, 9, and 10, but that they are required at the inputs of the division stages 2, 3, 4 and 5.

In the circuit-arrangement shown in Fig. 2, the reference numeral 14 denotes the frequency-regulated generator with a nominal frequency of 31,250 cycles and 15 denotes the source of alternating voltage furnishing the second alternating voltage with a nominal frequency 50. The alternating voltage appearing at the output 11 of the frequency-division circuit and the second alternating voltage from the supply 15 are fed to the phase-comparison stage 16 from which the regulating voltage for controlling the frequency of the generator 14 is derived through the lead 17. The second alternating voltage from the supply 15 is likewise fed to a frequency meter 18 which may be of known construction and produces a direct current through the exciter coils A, B and C, which current increases with an increase in frequency of the second alternating voltage. The exciter coil A forms part of a relay with break contact $a_1$ and make contact $a_2$. Associated with coil B are the make contact $b_1$ and the make contact $b_2$ of a second relay and associated with coil C are the break contact $c_1$, the break contact $c_2$ and the make contact $c_3$ of a third relay. With an increase in current the relays A, B and C are successively energized in the sequence referred to, whereas in the case of a decrease in current the decrease in energization occurs in the reversed order.

In order to restrict the line frequency variation to approximately 0.5%, the division factor of the frequency-division stage is regulated as listed below:

| Frequency of power line **15**: | Division factor |
|---|---|
| 50.75 to 50.25 | 619 |
| 50.25 to 49.75 | 625 |
| 49.75 to 49.25 | 631 |
| 49.25 to 48.75 | 637 |

In the position of the relay contacts as shown in Fig. 2 feedback occurs to the input of the stages 1, 2 (via break contact $a_1$) 8 and 9 corresponding to a division factor 637 and a frequency between 48.75 and 49.25 for the power line supply 15. The feedback to the input of the stages 1, 8 and 9 is permanent and will no longer be referred to. If the frequency of the supply 15 increases to a value between 49.25 and 49.75 the current through the exciter coils A, B and C increases accordingly with the result that break contact $a_1$ is deenergized and make-contact $a_2$ becomes energized. The feedback at the input of stage 2 is interrupted and that to the input of stage 4 is closed, corresponding to a division factor 631. If the frequency of the supply 15 increases as aforesaid to a value between 49.75 and 50.25 the make contact $b_1$ as well as the make contact $b_2$ become energized, thereby creating feedback to the inputs of the stages 2, 3 and 4, corresponding to a division factor 625. If the frequency of the supply 15 increases still further, the break contacts $c_1$, $c_2$ are deenergized and the make contact $c_3$ becomes energized, thereby provided feedback to the input of the stages 3 and 5 corresponding to a division factor 619.

In the present example, where the division factor changes in steps of 6, the scanning line frequency variation is already appreciably smaller than is proportional to the power line frequency variation.

When using, for example, a power line frequency of 50 cycles and a division factor 625, the frequency of the generator 14 is equal to 31,250. If the power line frequency changes to 49 this will, without using the circuit-arrangement in accordance with the invention, correspond to a generator frequency 30,625, whereas the use of the circuit-arrangement according to the invention yields $49 \times 637 = 31,213$, so that the line frequency itself has lightly decreased that is to say by 37, whereas otherwise a decrease by 625 would have occurred.

While particular values of scanning frequencies have been mentioned by way of example, it will be evident that the principles of the invention may be advantageously applied to television arrangements which use different values of scaning frequencies.

What is claimed is:

1. A circuit arrangement comprising a signal generator which includes means for selectively varying the frequency thereof, a standard frequency generator which is subject to having changes in the frequency thereof, a phase comparison stage, means connecting the output of said standard frequency generator to an input of said phase comparison stage, a frequency division circuit connected between said signal generator and another input of said phase comparison stage, a connection between the output of said phase comparison stage and said means for varying the frequency of the signal generator, and means connected between the output of said standard frequency generator and said frequency division circuit to change the division ratio of said frequency division circuit whenever the frequency of said standard frequency generator varies beyond a given value, whereby the frequency of said signal generator varies less than proportionally to the frequency variation of said standard frequency generator.

2. A circuit arrangement as claimed in claim 1, in which said frequency division circuit comprises a plurality of binary division stages connected in cascade, and in which said means for changing the division ratio comprises means connected to selectively apply feedback in at least one path around at least one of said binary division stages in accordance with the variation in frequency of said standard frequency generator.

3. A circuit arrangement as claimed in claim 2, in which said means to selectively apply feedback comprises a relay connected to be responsive to a change in frequency of said standard frequency generator, said relay having a contact connected to selectively open and close at least one path of said feedback.

4. A circuit arrangement as claimed in claim 3, further including a frequency meter connected to said standard frequency generator and adapted to produce a control signal which varies in accordance with frequency changes of said standard frequency generator, said relay being connected to be responsive to a given value of said control signal, and another relay connected to be responsive to another given value of said control signal and having a contact connected to selectively open and close at least one other path of said feedback.

References Cited in the file of this patent

UNITED STATES PATENTS 2,521,789 Grosdoff ---------------- Sept. 12, 1950